United States Patent
Takagi (10) Patent No.: US 6,912,066 B2
(45) Date of Patent: Jun. 28, 2005

(54) IMAGE PROCESSING METHOD AND APPARATUS FOR PERFORMING PROCESSING ACCORDING TO THE TYPE OF RENDERING COMMAND, AND PROGRAM IMPLEMENTING IMAGE PROCESSING METHOD

(75) Inventor: Yoshihiro Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 884 days.

(21) Appl. No.: 09/900,034

(22) Filed: Jul. 9, 2001

(65) Prior Publication Data

US 2002/0036784 A1 Mar. 28, 2002

(30) Foreign Application Priority Data

Jul. 25, 2000 (JP) ......................................... 2000-223822

(51) Int. Cl.[7] ............................ H04N 1/46; G06K 15/00
(52) U.S. Cl. .......................... 358/1.9; 358/2.1; 382/162
(58) Field of Search .......................... 358/1.9, 2.1, 515, 358/518, 520, 530; 382/162, 167

(56) References Cited

U.S. PATENT DOCUMENTS

| | | | |
|---|---|---|---|
| 4,963,898 A | 10/1990 | Kadowaki et al. | 346/157 |
| 5,758,044 A | 5/1998 | Zandee et al. | 395/115 |
| 6,088,124 A | 7/2000 | Tanaka | 358/1.9 |

FOREIGN PATENT DOCUMENTS

| | | | | |
|---|---|---|---|---|
| EP | 0 674 289 A2 | | 1/1995 | .......... G06K/15/02 |
| JP | 3039649 | | 2/1991 | .......... G01N/29/00 |
| JP | 410200778 | * | 7/1998 | .......... H04N/1/60 |
| JP | 02001189875 A | * | 7/2001 | .......... H04N/1/60 |
| JP | 1176549 | * | 1/2002 | .......... G06T/1/00 |

\* cited by examiner

*Primary Examiner*—Jerome Grant, II
(74) *Attorney, Agent, or Firm*—Fitzpatrick, Cella, Harper & Scinto (57) ABSTRACT

The number of colors used in the object image indicated by a raster image rendering command is counted. The format of the object image is then converted according to the number of counted colors. The data size of the raster image is then reduced without impairing the quality of the raster image, thereby increasing processing performance.

11 Claims, 5 Drawing Sheets

IMAGE PROCESSING METHOD AND APPARATUS FOR PERFORMING PROCESSING ACCORDING TO THE TYPE OF RENDERING COMMAND, AND PROGRAM IMPLEMENTING IMAGE PROCESSING METHOD

BACKGROUND OF THE INVENTION

1. Field of the Invention

The present invention relates to an image processing method and apparatus for performing processing according to a type of rendering command. The invention also pertains to a program implementing the above-described image processing method.

2. Description of the Related Art

Rendering data handled by a printer driver is largely divided into three data types, such as text, vector graphics, and raster images. Generally, among the three data types, raster images occupy the largest amount of data in a data stream which is transmitted from a basic operating system (OS) to a printer via a printer driver, thereby greatly influencing the performance of printing processing.

Accordingly, for decreasing the amount of data in raster images, the following techniques are employed to increase the performance of printing processing:

(1) executing half-tone processing in the printer driver and sending device-dependent binary raster images to the printer;

(2) performing data compression; and (3) combining operations (1) and (2).

With any of the above-described techniques employed, the data size of raster images to be sent to the printer can be reduced.

According to the above-described technique (1), performance of printing processing can be increased. However, since final output images are created in the printer driver, it is difficult to perform intelligent image processing in the printer.

SUMMARY OF THE INVENTION

Accordingly, in view of the above background, it is an object of the present invention to increase processing performance by reducing data size of raster images without impairing the quality of raster images, for example, without creating binary raster images.

In order to achieve the above object, according to one aspect of the present invention, there is provided an image processing method for performing processing according to the type of rendering command. The image processing method includes: an analysis step of analyzing a rendering command indicating an object image so as to identify the type of object image; a determination step of determining whether the number of colors used in the object image is two when the object image is a raster image; and a color processing step of converting the format of the object image into a raster image having one bit per pixel and possessing a palette indicating two colors when the number of colors determined in the determination step is two, and of performing raster image color processing on the palette indicating two colors.

According to another aspect of the present invention, there is provided an image processing method for performing processing according to the type of rendering command. The image processing method includes: a first determination step of determining whether the number of colors used in an object image indicated by a raster image rendering command is one; and a substitution step of substituting the raster image rendering command by fill processing using a monochromatic brush when the number of colors determined in the first determination step is one.

According to still another aspect of the present invention, there is provided an image processing apparatus for performing processing according to the type of rendering command. The image processing apparatus includes an analysis unit for analyzing a rendering command indicating an object image so as to identify the type of object image. A determination unit determines whether the number of colors used in the object image is two when the object image is a raster image. A color processing unit converts the object image into a raster image having one bit per pixel and possessing a palette indicating two colors when the number of colors determined by the determination unit is two, and performs raster image color processing on the palette indicating two colors.

According to a further aspect of the present invention, there is provided an image processing apparatus for performing processing according to the type of rendering command. The image processing apparatus includes a determination unit for determining whether the number of colors used in an object image indicated by a raster image rendering command is one. A substitution unit substitutes the raster image rendering command by fill processing using a monochromatic brush when the number of colors determined by the determination unit is one.

According to a yet further aspect of the present invention, there is provided a program implementing an image processing method for performing processing according to the type of rendering command. The program includes: an analysis step of analyzing a rendering command indicating an object image so as to identify the type of object image; a determination step of determining whether the number of colors used in the object image is two when the object image is a raster image; and a color processing step of converting the format of the object image into a raster image having one bit per pixel and possessing a palette indicating two colors when the number of colors determined in the determination step is two, and of performing raster image color processing on the palette indicating two colors.

According to a further aspect of the present invention, there is provided a program implementing an image processing method for performing processing according to the type of rendering command. The program includes: a determination step of determining whether the number of colors used in an object image indicated by a raster image rendering command is one; and a substitution step of substituting the raster image rendering command by fill processing using a monochromatic brush when the number of colors determined in the determination step is one.

Further objects, features and advantages of the present invention will become apparent from the following description of the preferred embodiments with reference to the attached drawings.

DESCRIPTION OF THE PREFERRED EMBODIMENTS

The present invention is described in detail below with reference to the accompanying drawings through illustration of preferred embodiments. In the following embodiments, although a color printer is used as an example, a monochrome printer may also be used in the present invention.

First Embodiment

A first embodiment of the present invention is discussed below.

Figure 1:
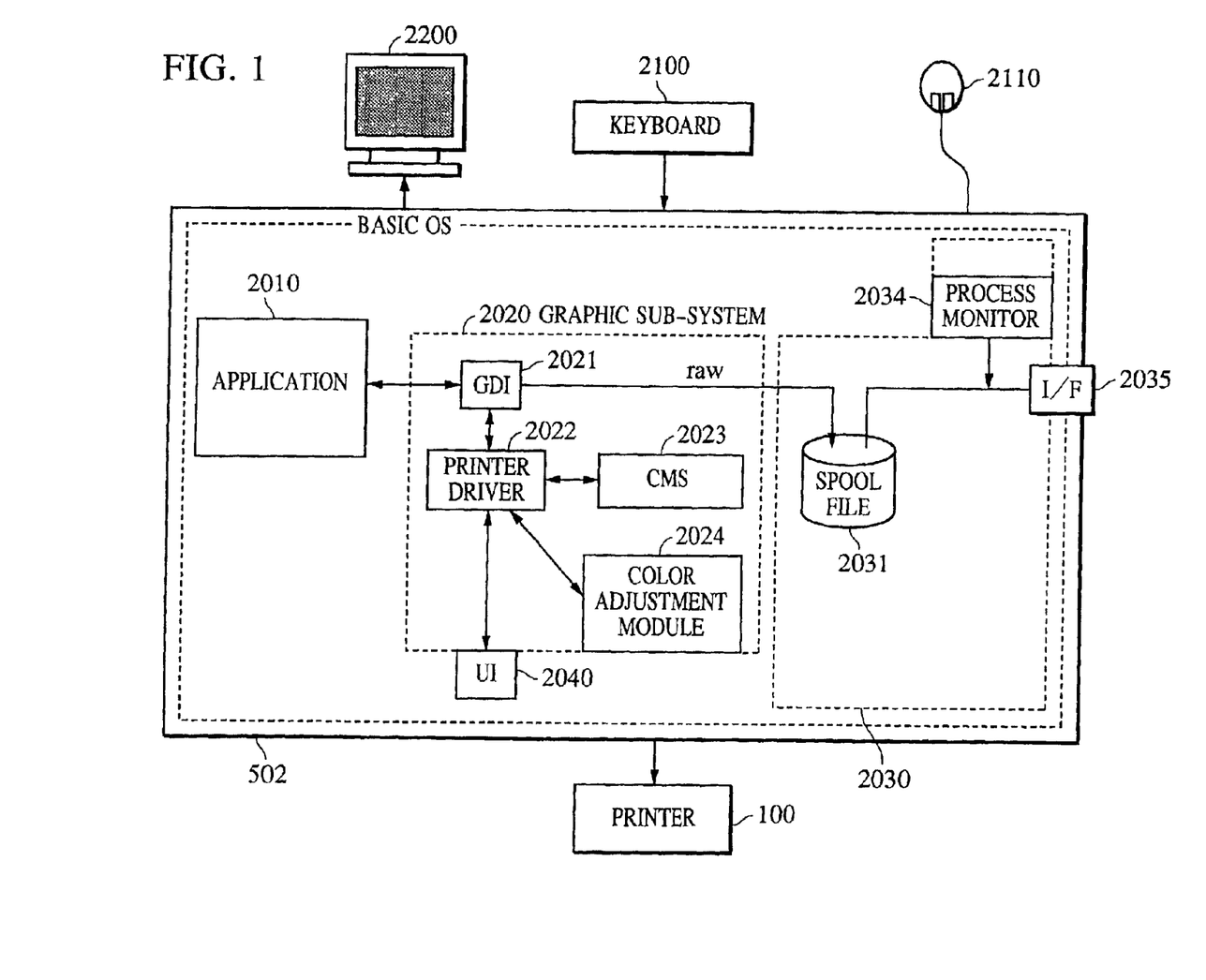
FIG. 1 is a block diagram illustrating a host system according to an embodiment of the present invention.

Reference is first made to the system configuration shown in FIG. 1. A host computer 502 outputs printing information including print data and control code to a printer 100. The host computer 502 includes a keyboard 2100, a mouse 2110, which serves as a pointing device, and a display monitor 2200, which serves as a display device. The host computer 502 is operated under a basic OS, such as Windows (trade name) produced by Microsoft Corporation.

In terms of the functions in this embodiment, the functions of the host computer 502 on the basic OS is divided into an application 2010, a graphic sub-system 2020, and a spool sub-system 2030.

The application 2010 performs image editing processing, such as retouch processing, or document composing processing, for example, word processing, thereby creating input images.

The graphic sub-system 2020, which serves as image information processing means, is formed of a graphics device interface (hereinafter referred to as the "GDI") 2021, which serves as part of the functions of the basic OS, and a printer driver 2022, which serves as a device driver dynamically linked to the GDI 2021. The main function of the printer driver 2022 is to convert a rendering command indicating an object image, which is called as a GDI, into a page description language (PDL) interpretable by the printer 100.

In performing rendering processing, the printer driver 2022 requests a color management system (CMS) module 2023 and a color adjustment module 2024 to perform processing according to the type of GDI rendering command based on the conditions specified by a user input through a user interface.

For example, if color matching conditions are individually specified by the user for each of an image, text, and graphics, the printer driver 2022 analyzes the type of GDI rendering command so as to determine the type of object image, such as image, text, or graphics. Then, the printer driver 2022 requests the CMS module 2023 to perform color matching processing according to the color matching conditions reflecting the determined type of object image. The same also applies to color adjustments.

The graphic sub-system 2020 stores the converted PDL in a spool file 2031.

The spool sub-system 2030 is positioned subsequent to the graphic sub-system 2020 and is unique to the printer device. The spool sub-system 2030 is formed of the spool file 2031, which serves as data storage means (in actuality, a hard disk), and a process monitor 2034 for monitoring the progress of the printing processing in the printer 100 so as to control the output of PDL code stored in the spool file 2031 to the printer 100.

A user interface (UI) processor 2040 displays various menu buttons for the user so as to determine parameters for controlling the printing quality by using the functions provided by the basic OS, and also analyzes user actions.

The above-described terms and functional frames may be dependent on the basic OS. However, any module implementing the above-described technical means can be used in this embodiment.

For example, in another basic OS, a spooler or a spool file may be implemented by integrating processing into a module, which is referred to as a "print queue".

Generally, the host computer 502 including the aforementioned functional modules is operated under the control of software, which is referred to as "basic software", by using hardware, such as a central processing unit (CPU), a read only memory (ROM), a random access memory (RAM), a hard disk drive (HDD), and an input/output (I/O) controller, although they are not shown. Under the control of the basic software, the application software and subsystem processes are operated as the functional modules.

Figure 2:
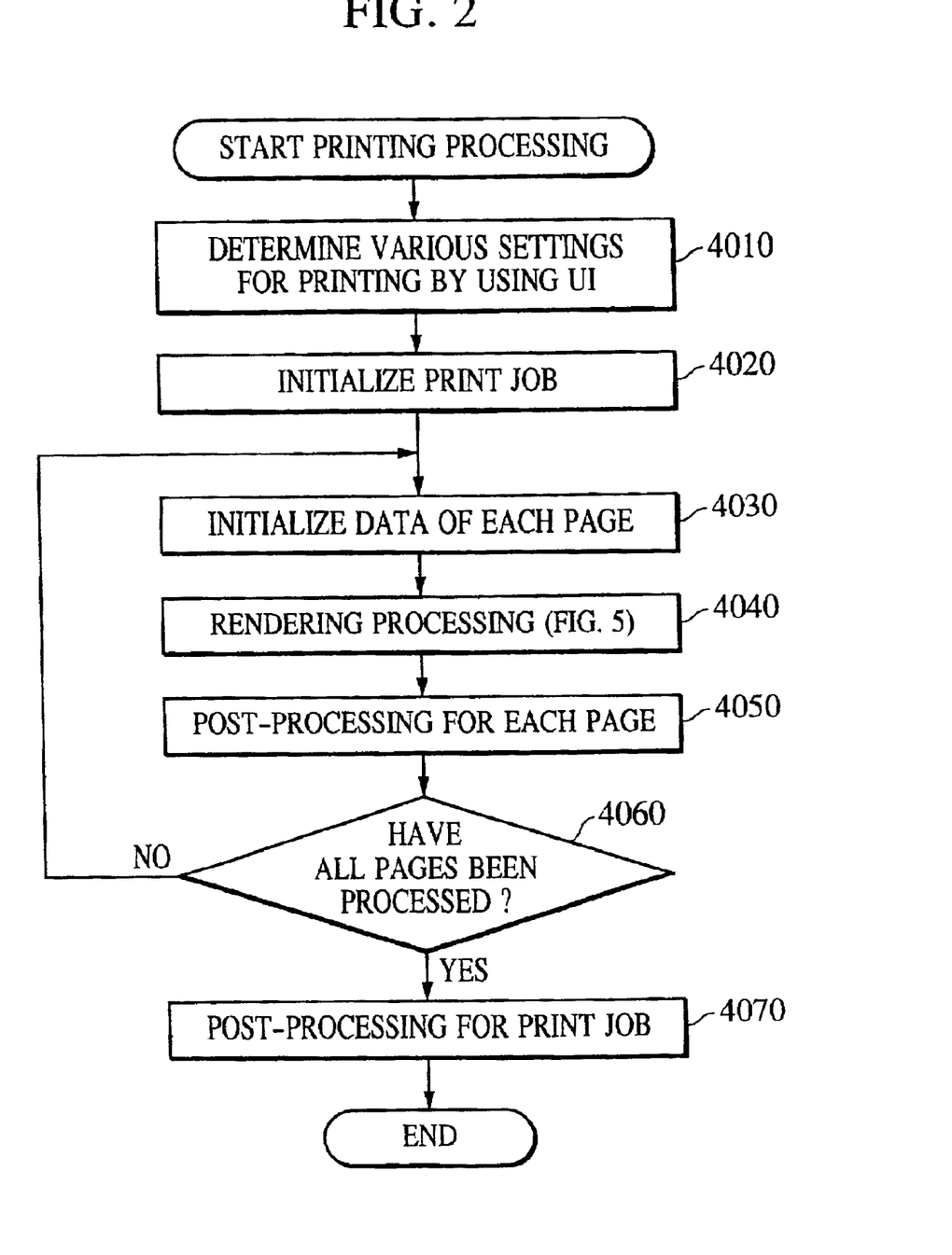
FIG. 2 is a flow chart illustrating printing processing performed by a printer driver.

The processing of the printer driver 2022 is discussed below with reference to the flow chart of FIG. 2.

When the user clicks on a printing menu while performing processing on the application, the user interface of the main printing sheet is displayed. In step 4010, the user determines various settings, such as the output printer, the paper size, the number of copies, the printing quality, the color matching conditions, and the color adjustment conditions, on the main printing sheet, thereby providing printing instructions.

Then, in step 4020, the printer driver 2022 initializes the print job. In step 4030, the printer driver 2022 initializes data of each page. Subsequently, in step 4040, the printer driver 2022 performs rendering processing, which is discussed in detail below with reference to FIG. 3. In step 4050, the printer driver 2022 further performs post-processing, such as a page break.

It is then determined in step 4060 whether all the pages have been processed. If the outcome of step 4060 is no, the process returns to step 4030, and processing is performed for the subsequent page. If the result of step 4060 is yes, the process proceeds to step 4070 in which post-processing is performed on the print job. The printing processing is then completed.

Figure 3:
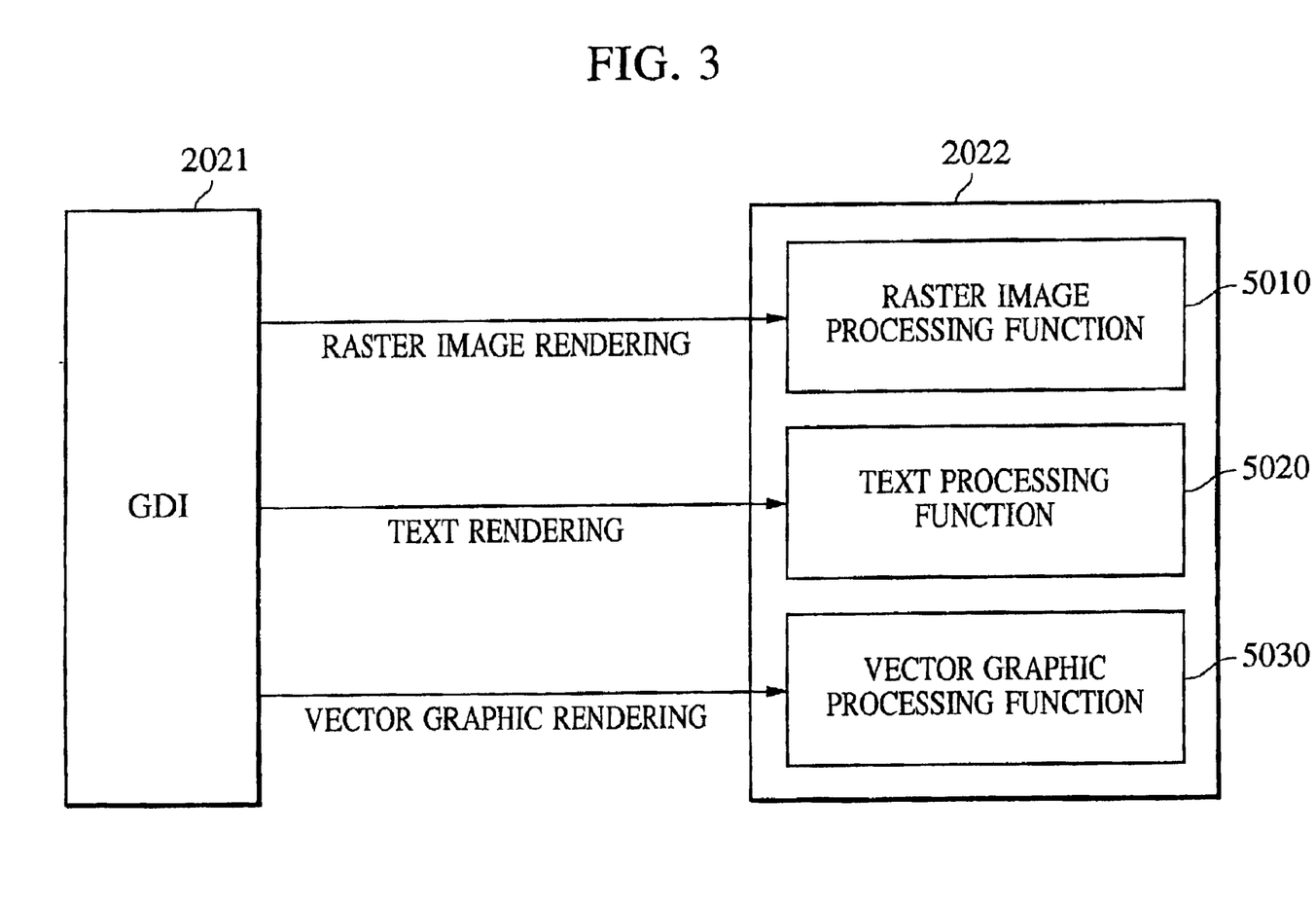
FIG. 3 is a block diagram illustrating the relationships between a graphics device interface (GDI) and the printer driver.

FIG. 3 illustrates the rendering processing performed in step 4040 and also illustrates the relationships between the GDI 2021 and the printer driver 2022 shown in FIG. 1.

The raster image rendering processing is performed by calling a raster image processing function 5010 implemented in the printer driver 2022 by the GDI 2021. Similarly, the text rendering processing and the graphics rendering processing is performed by calling a text processing function 5020 and a vector graphics processing function 5030, respectively, implemented in the printer driver 2022 by the GDI 2021.

If a plurality of object images are contained in one page, the rendering processing in step 4040 is performed for each object image by calling the corresponding function according to the type of rendering command. In this case, as discussed above, the printer driver 2022 requests the CMS module 2023 and the color adjustment module 2024 to perform processing.

The raster image processing implemented by the raster image processing function 5010 is specifically discussed below with reference to the flow chart of FIG. 4.

In step 6010, the format of the raster image delivered from the GDI 2021 is first checked. It is then determined whether the number of bits per pixel of the raster image is eight or greater. If the outcome of step 6010 is no, the process proceeds to step 6020 in which conventional raster image processing is performed. If the result of step 6020 is yes, the process proceeds to step 6030 in which the number of colors iCol contained in the raster image delivered from the GDI 2021 is counted.

If the raster image does not possess a palette, and each pixel is represented by a plurality of color components, the values of the individual pixels are compared, and the number of pixels with different values is counted in step 6030. If the raster image possesses a palette, and each pixel is represented by an index value indicating a palette color, the index values of the individual pixels are compared, and the number of pixels with different index values is counted in step 6030.

The palette indicates the relationships between the index values of the individual palette colors and the values of the corresponding color components.

It is then determined in step 6040 whether iCol exceeds two. If the outcome of step 6040 is yes, the process proceeds to step 6020 in which the known raster image processing is performed. If it is found in step 6040 that iCol is two or less, the process proceeds to step 6050 in which the format of the raster image is converted into an image having one bit per pixel and possessing a palette having two colors.

Then, the process proceeds to step 6020 in which the conventional raster image processing is performed.

The conventional raster image processing performed in step 6020 is as follows.

If the raster image does not possess a palette, the color matching processing by the CMS module 2023 and the color adjustment processing by the color adjustment module 2024 are performed on each pixel. Based on the processed results, PDL data indicating a raster image is created.

If the raster image possesses a palette, the color matching processing by the CMS module 2023 and the color adjustment processing by the color adjustment module 2024 are performed on a plurality of color components representing the corresponding palette colors contained in the palette. Then, PDL data including the palette which stores the processed results as palette colors and the raster image data represented by the index values is created.

According to the above-described process passing through step 6050, the data size of the raster image input into the printer driver 2022 can be reduced without impairing the quality of the raster image. Accordingly, high-precision color processing can be performed in the printer 100.

If the format of the raster image is converted in step 6050, color processing is not performed on each pixel, thereby decreasing the number of color processing operations. As a result, the time required for color processing can be reduced.

Second Embodiment

A second embodiment of the present invention is described in detail below. The second embodiment is similar to the first embodiment, except that the raster image rendering shown in FIG. 3 is performed by the flow of the raster image processing shown in FIG. 5, which is discussed in detail below.

Figure 5:
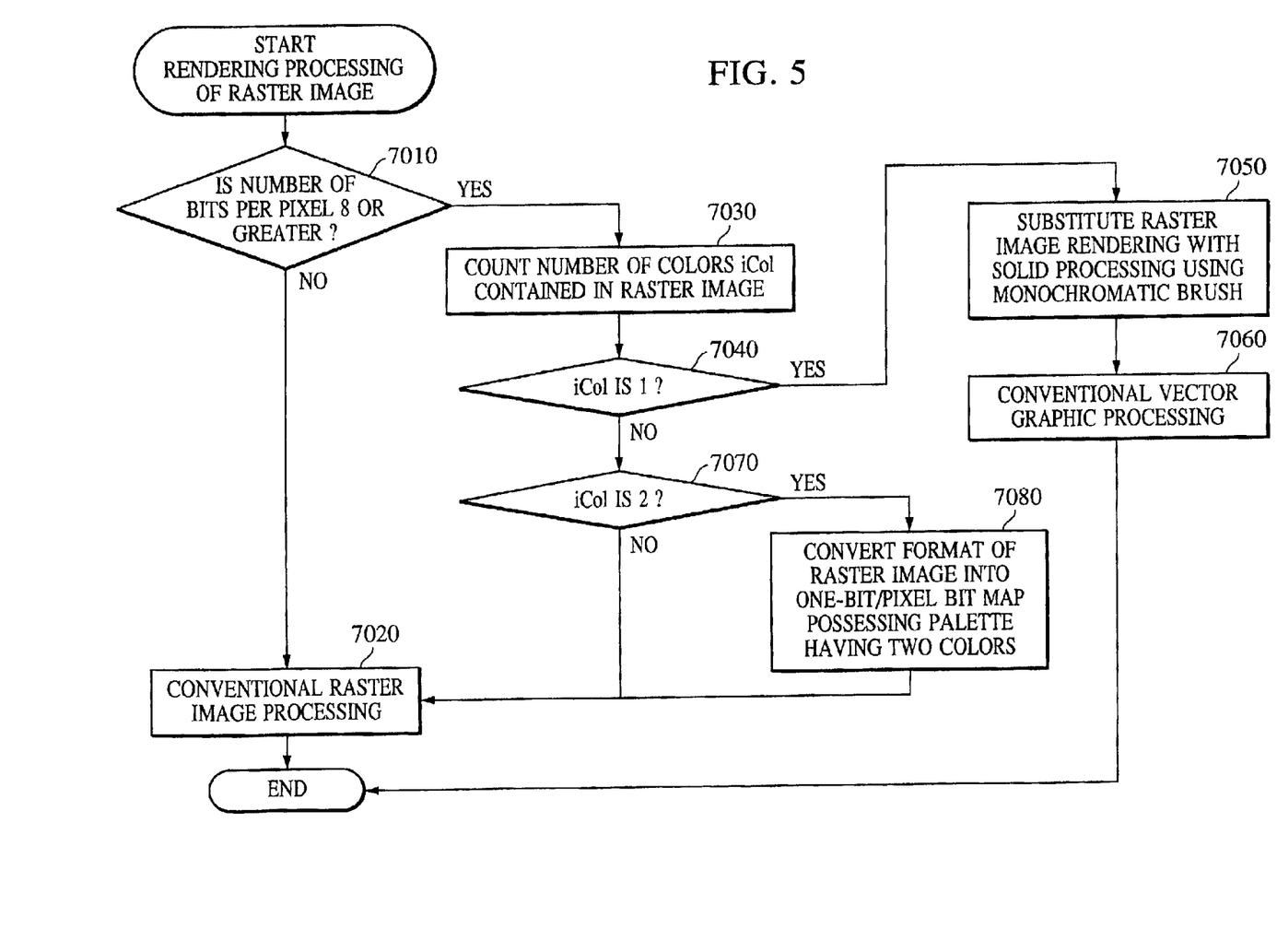
FIG. 5 is a flow chart illustrating raster image processing according to a second embodiment of the present invention.

In step 7010, the format of the raster image delivered from the GDI 2021 is checked.

It is then determined whether the number of bits per pixel of the raster image is eight or greater. If the result of step 7010 is no, the process proceeds to step 7020 in which the known raster image processing is performed.

If the outcome of step 7010 is yes, the process proceeds to step 7030 in which the number of colors iCol contained in the raster image delivered from the GDI 2021 is counted.

A determination is then made in step 7040 as to whether iCol is one. If iCol is one, the process proceeds to step 7050 in which the raster image rendering processing is substituted by fill processing using a monochromatic brush. The process then proceeds to step 7060 in which known vector graphic processing is performed.

The known vector graphic processing is performed by the vector graphic processing function 5030 shown in FIG. 3. More specifically, the color matching processing and the color adjustment processing for graphics are performed on color data indicating a monochromatic brush color. By using the processed color data, fill processing using the monochromatic brush is performed.

If it is found in step 7040 that iCol is not one, the process proceeds to step 7070 in which it is determined whether iCol is two. If the outcome of step 7070 is yes, the process proceeds to step 7080 in which the format of the raster image is converted into a raster image having one bit per pixel and possessing a palette indicating two colors. Then, the process proceeds to step 7020 in which the known raster image processing is performed.

If it is found in step 7070 that iCol is not two, the conventional raster image processing is performed in step 7020.

According to the process passing through step 7050 or 7080, the data size of the raster image input into the printer driver 2022 can be reduced without impairing the quality of the raster image.

It is now assumed that a 640×480 raster image is input. In this case, if the process passes through step 7080, the CMS processing is performed on the two monochromatic colors, thereby requiring the CMS processing only twice. If the process passes through step 7050, the CMS processing is performed on the one monochromatic color, thereby requiring the CMS processing only once.

In contrast, if the process passes through neither step 7080 nor step 7050 according to a conventional method, it is necessary to perform the CMS processing 307200 (640× 480) times.

In this manner, according to the first embodiment, the performance of the printer driver when a specific image is input can be considerably increased.

Modifications

Figure 4:
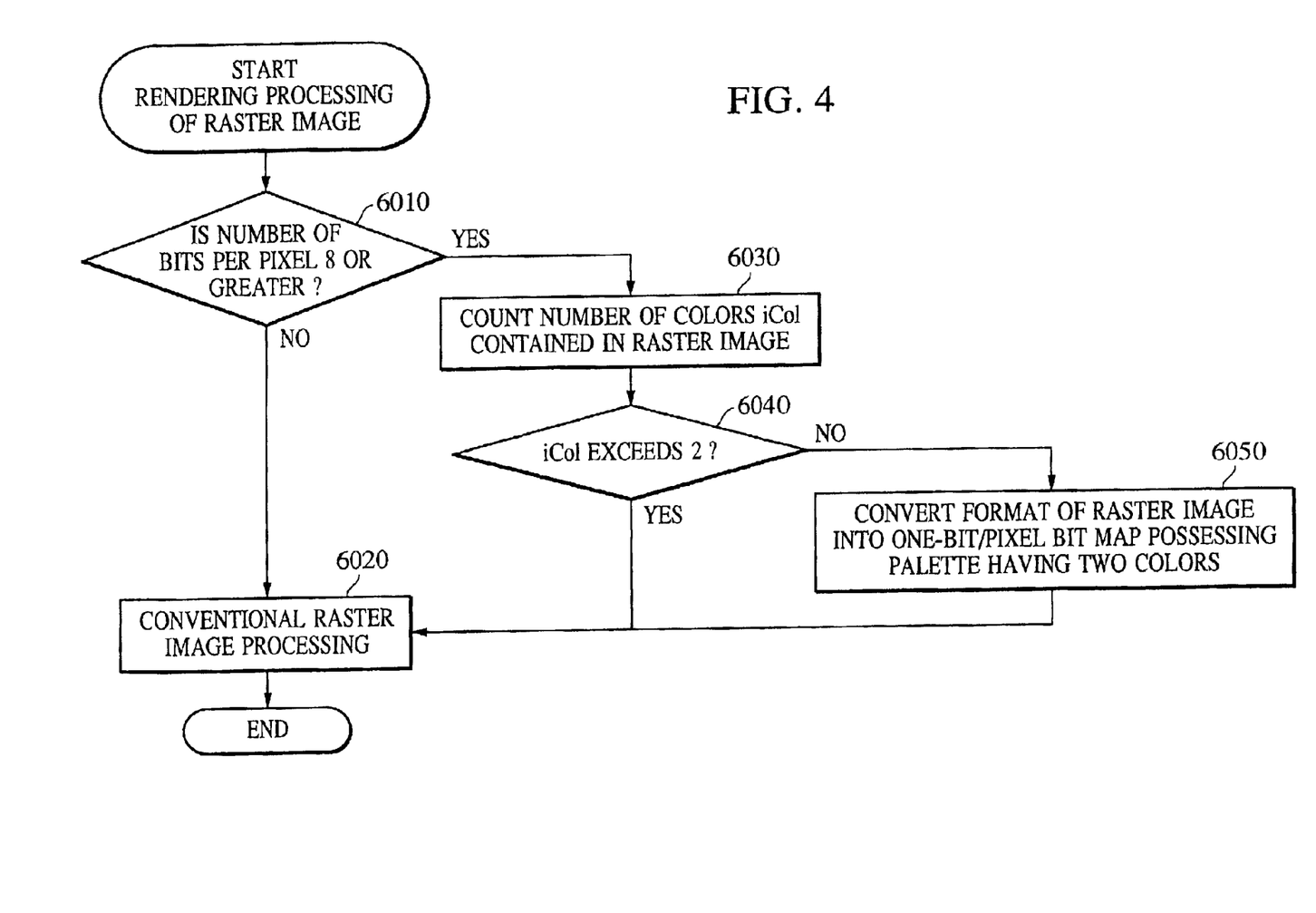
FIG. 4 is a flow chart illustrating raster image processing according to a first embodiment of the present invention.

In the first and second embodiments, the values set in step 6010 and step 6040 shown in FIG. 4 and step 7010 and step 7070 shown in FIG. 5 may be changed.

In step 6010 shown in FIG. 4 and step 7010 shown in FIG. 5, it is determined based on the number of bits per pixel whether the processing performance can be increased if a palette is created according to the format of the input raster image, in other words, whether it is worth counting the number of colors.

The value set in step 6040 shown in FIG. 4 or in step 7070 shown in FIG. 5 may be any value if it can be considered that the processing performance is increased if a palette is created in consideration of the time required for creating the palette and converting the raster image data based on the created palette.

Although in the foregoing embodiments the color matching processing and the color adjustment processing are performed by the host computer 502, they may be performed by the printer 100. In this case, the amount of data in the raster image can also be reduced if predetermined conditions are satisfied in the first or second embodiment, thereby increasing the performance of printing processing.

The object of the present invention can also be achieved by the following modification. A storage medium for storing a software program code implementing the functions of the first or second embodiment may be supplied to a system or an apparatus. Then, a computer (or a CPU or an MPU) of the system or the apparatus may read and execute the program code from the storage medium.

In this case, the program code itself read from the storage medium implements the novel functions of the present invention. Accordingly, the storage medium storing such program code constitutes the present invention.

Examples of the storage medium for storing and supplying the program code include a floppy disk, a hard disk, an optical disc, a magneto-optical disk, a compact disc read only memory (CD-ROM), a CD-recordable (CD-R), digital versatile disk (DVD)-ROM, a magnetic tape, a non-volatile memory card, a ROM, and an electrically erasable read only memory (EEPROM).

The functions of the foregoing embodiments may be implemented not only by running the read program code on the computer, but also by wholly or partially executing the processing by an OS running on the computer based on the instructions of the program code. The present invention also encompasses such a modification.

The functions of the above-described embodiments may also be implemented by the following modification. The program code read from the storage medium is written into a memory provided on a feature expansion board inserted into the computer or a feature expansion unit connected to the computer. Then, a CPU provided for the feature expansion board or the feature expansion unit partially or wholly executes the processing based on the instructions of the program code.

As is seen from the foregoing description, according to the present invention, the processing performance can be increased by reducing the data size of raster images without impairing the quality.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing method of performing processing according to a type of rendering command, said image processing method comprising:

an analysis step of analyzing a rendering command indicating an object image so as to identify a type of the object image;

a determination step of determining whether a number of colors used in the object image is two when the object image is a raster image; and a color processing step of converting a format of the object image into a raster image having one bit per pixel and possessing a palette indicating two colors when the number of colors determined in said determination step is two, and of performing raster image color processing on the palette indicating two colors.

2. An image processing method according to claim 1, wherein, when a number of bits of each pixel of the object image whose type is a raster image is equal to or greater than a predetermined value, said determination step is not performed.

3. An image processing method according to claim 1, wherein said image processing method is performed by a printer driver, and said raster image color processing comprises color matching processing and color adjustment processing.

4. An image processing method of performing processing according to a type of rendering command, said image processing method comprising:

a first determination step of determining whether a number of colors used in an object image indicated by a raster image rendering command is one; and a substitution step of substituting the raster image rendering command by fill processing using a monochromatic brush when the number of colors determined in said first determination step is one.

5. An image processing method according to claim 4, wherein raster image color processing is performed for the raster image rendering command, vector graphic color processing is performed for a vector graphic rendering command, and said vector graphic color processing is performed for the rendering command which is substituted by the fill processing in said substitution step.

6. An image processing method according to claim 4, further comprising:

a second determination step of determining a number of colors used in the object image;

a creation step of creating a palette according to the number of colors determined in said second determination step; and a conversion step of converting the raster image rendering command into data using the palette created in said creation step.

7. An image processing method according to claim 4, wherein the rendering command comprises rendering commands indicating text and graphics.

8. An image processing apparatus for performing processing according to a type of rendering command, comprising:

- an analysis unit for analyzing a rendering command indicating an object image so as to identify a type of the object image;
- a determination unit for determining whether a number of colors used in the object image is two when the object image is a raster image; and
- a color processing unit for converting said object image into a raster image having one bit per pixel and possessing a palette indicating two colors when the number of colors determined by said determination unit is two, and for performing raster image color processing on the palette indicating two colors.

9. An image processing apparatus for performing processing according to a type of rendering command, comprising:

- a determination unit for determining whether a number of colors used in an object image indicated by a raster image rendering command is one; and
- a substitution unit for substituting the raster image rendering command by fill processing using a monochromatic brush when the number of colors determined by said determination unit is one.

10. A program implementing an image processing method of performing processing according to a type of rendering command, said program comprising:

- an analysis step of analyzing a rendering command indicating an object image so as to identify a type of the object image;
- a determination step of determining whether a number of colors used in the object image is two when the object image is a raster image; and
- a color processing step of converting a format of the object image into a raster image having one bit per pixel and possessing a palette indicating two colors when the number of colors determined in said determination step is two, and of performing raster image color processing on the palette indicating two colors.

11. A program implementing an image processing method of performing processing according to a type of rendering command, said program comprising:

- a determination step of determining whether a number of colors used in an object image indicated by a raster image rendering command is one; and
- a substitution step of substituting the raster image rendering command by fill processing using a monochromatic brush when the number of colors determined in said determination step is one.

* * * * *

UNITED STATES PATENT AND TRADEMARK OFFICE
CERTIFICATE OF CORRECTION

PATENT NO. : 6,912,066 B2
DATED : June 28, 2005
INVENTOR(S) : Yoshihiro Takagi It is certified that error appears in the above-identified patent and that said Letters Patent is hereby corrected as shown below:

<u>Title page,</u>
Item [56], References Cited, FOREIGN PATENT DOCUMENTS,
"JP         117549" should read -- EP         1 176 549 A2 --.

Signed and Sealed this

Eleventh Day of April, 2006

JON W. DUDAS
*Director of the United States Patent and Trademark Office*